(12) United States Patent
Kamiyama et al.

(10) Patent No.: US 7,443,532 B2
(45) Date of Patent: *Oct. 28, 2008

(54) NETWORK SCANNER SYSTEM

(75) Inventors: Tadanobu Kamiyama, Yokosuka (JP); Takeshi Ogaki, Tama (JP); Yoshiko Takeda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,862

(22) Filed: Jul. 19, 2007

(65) Prior Publication Data

US 2007/0263253 A1      Nov. 15, 2007

Related U.S. Application Data (63) Continuation of application No. 10/950,791, filed on Sep. 28, 2004, now Pat. No. 7,262,887, which is a continuation of application No. 09/284,066, filed as application No. PCT/JP98/03490 on Aug. 5, 1998, now Pat. No. 6,825,942.

(30) Foreign Application Priority Data

Aug. 7, 1997    (JP)    .................................. 9-213193

(51) Int. Cl.
 G06K 15/00    (2006.01)
 G06F 1/00    (2006.01)
(52) U.S. Cl. ..................... 358/1.15; 358/402; 358/1.16; 381/305; 379/100.08
(58) Field of Classification Search ................ 358/1.15, 358/444, 1.16, 1.18, 402, 403, 486; 381/305, 381/306; 379/100.08, 100.17, 93.32, 93.31
See application file for complete search history.

(56) References Cited

U.S. PATENT DOCUMENTS

| 5,568,540 | A | 10/1996 | Greco et al. |
| 5,608,786 | A | 3/1997 | Gordon |
| 5,764,866 | A | 6/1998 | Maniwa |
| 5,893,908 | A | 4/1999 | Cullen et al. |
| 5,926,824 | A | 7/1999 | Hashimoto |
| 6,061,478 | A | 5/2000 | Kanoh et al. |
| 6,072,862 | A | 6/2000 | Srinivasan |
| 6,115,739 | A | 9/2000 | Ogawa et al. |

(Continued)

FOREIGN PATENT DOCUMENTS

EP    0 679 014 A2    10/1995

(Continued)

*Primary Examiner*—Edward L. Coles
*Assistant Examiner*—Negussie Worku
(74) *Attorney, Agent, or Firm*—Foley & Lardner LLP (57) ABSTRACT

An image input section pre-inputs an image. A temporary storage section temporarily stores the image input by the image input section. An attribute control section controls at least attribute information of the input information temporarily stored in the temporary storage section. A selection section permits a user at the origin of image request to select a desired one of already stored images stored in the temporary storage section in accordance with the attribute information controlled by the attribute control section. An image transfer section reads out the desired image selected by the selection section from the temporary storage section at the time of the request by origin of the image request and transfers the desired image to the origin of the image request via a network.

13 Claims, 4 Drawing Sheets

U.S. PATENT DOCUMENTS

| | | |
|---|---|---|
| 6,188,766 B1 | 2/2001 | Kocher |
| 6,188,807 B1 | 2/2001 | Arakawa |
| 6,466,330 B1 * | 10/2002 | Mori ......................... 358/1.15 |
| 6,498,837 B1 * | 12/2002 | Baba ..................... 379/100.08 |
| 6,590,673 B2 | 7/2003 | Kadowaki |
| 6,825,942 B1 | 11/2004 | Kamiyama et al. |
| 6,959,122 B2 * | 10/2005 | McIntyre .................... 382/305 |
| 7,262,887 B2 * | 8/2007 | Kamiyama et al. .......... 358/474 |
| 7,362,467 B1 * | 4/2008 | Tsukimura ................. 358/1.9 |

FOREIGN PATENT DOCUMENTS

| | | |
|---|---|---|
| EP | 0 767 575 A2 | 4/1997 |
| JP | 63-165976 A | 7/1988 |
| JP | 1-302472 A | 12/1989 |
| JP | 7-23177 A | 1/1995 |
| JP | 7-298009 A | 11/1995 |
| JP | 8-190519 A | 7/1996 |
| JP | 8-237490 A | 9/1996 |
| JP | 9-102846 A | 4/1997 |
| JP | 9-102856 A | 4/1997 |
| JP | 9-284448 A | 10/1997 |
| JP | 10-13581 A | 1/1998 |
| JP | 10-233880 A | 9/1998 |

* cited by examiner

| CURRENT POINTER | IMAGE FILE NAME | INPUT DATA/TIME | USER NAME | READ MODE | ID CODE |
|---|---|---|---|---|---|
| 401 | 402 | 403 | 404 | 405 | 406 |
| | | | | | |

NETWORK SCANNER SYSTEM

The present application is a continuation of U.S. application Ser. No. 10/950,791, filed Sep. 28, 2004 now U.S. Pat. No. 7,262,887, which is a continuation of U.S. application Ser. No. 09/284,066, filed Apr. 7, 1999, now U.S. Pat. No. 6,825,942, which is a National Stage Application of PCT/JP98/03490, filed Aug. 5, 1998, which claims priority from Japan 9-213193 filed Aug. 7, 1997, the entire contents of which are incorporated herein by reference.

TECHNICAL FIELD

The present invention relates to a network scanner system and in particular to a network scanner system capable of realizing an operational environment for a shared scanner connected to a network in working at offices, which is the same as or better than an operational environment for a locally connected scanner.

BACKGROUND ART

Conventionally, there is a great need to use a scanner to input image information in working at offices, thereby constituting a database or reusing it as documents.

In general, in such a case, a scanner is locally connected to a personal computer (PC), and the user in most uses operates the PC or work station (WS) directly and inputs image information to the scanner.

This mode of use, in which the scanner is locally connected, is suitable to a case where the scanner is provided for personal exclusive use. It is useless, however, to provide an expensive, high-speed and high-performance scanner for personal exclusive use.

In the use in which a great deal of images/documents are treated, there is a higher demand for sharing a high-speed and high-performance, if expensive, scanner with a plurality of users.

In the prior art, even in the case where such a scanner is shared by the users, the general mode of use is such that each user goes to the PC or WS, to which the scanner is connected, performs input operations, transfers or fetches data by some method, and brings the data to his/her own desk for use.

On the other hand, the network-coupled type scanner has recently been developed (Hewlett-Packard; Scanjet 4Si).

However, where this network-coupled type scanner is used, an exclusive application is required on the PC and the application for scanner, which has been used thus far on the PC, cannot be used directly.

In addition, where the network-coupled type scanner is used, if there is a discrepancy in attributes of input images, e.g. size, resolution or density of color, between the time of inputting an image and the time of using the image, the input has to be performed once again.

Specifically, there is a serious problem in operability with the use of the network-coupled scanner, although such a problem is not conspicuous with the scanner connected to the user's own PC directly, that is, locally.

DISCLOSURE OF INVENTION

The present invention has been made in consideration of the above circumstances and its object is to provide a network scanner system wherein an operational environment for a shared scanner connected to a network, which is the same as or better than an operational environment for a locally connected scanner, can be realized, and image information can be input with use of a scanner to constitute a database or reuse the information as documents in working at offices, thereby meeting a need for using a great deal of images/documents.

In order to achieve the object, in the network scanner system of this invention, attribute information of a plurality of terminals connected via a network is managed and image information input from the scanner is stored. Upon request for transfer of image information from each terminal, the image information is selected on the basis of a predetermined determination standard and the image information is converted to have attributes matching with the terminal. The resultant image information is transferred. Thus, each terminal can use the transferred image information with no alteration.

According to an aspect of the invention, there is provided a network scanner system comprising:

a plurality of terminals connected via a network;

storage means, connected via the network, for storing attribute information of each of the plurality of terminals;

image read input means, connected via the network, for reading an image, converting the image to electronically processed image information, and inputting the image information;

temporary storage means for temporarily storing the electronically processed image information input from the image read input means;

reception means for receiving a transfer request, from the plurality of terminals, for transfer of the image information read by the image read input means;

conversion means for reading, when the reception means has received the transfer request for the transfer of the image information from the plurality of terminals, the attribute information of the terminal associated with the transfer request out of the storage means, and converting the image information stored in the temporary storage means on the basis of the read-out attribute information; and transfer means for transferring via the network the image information converted by the conversion means to the terminal of an origin of the transfer request.

According to another aspect of the invention, there is provided a network scanner system comprising:

a plurality of terminals connected via a network;

image read input means, connected via the network, for reading an image, converting the image to electronically processed image information, and inputting the image information;

document discrimination means for discriminating the kind of document from the electronically processed image information input by the image read input means for each input image information unit;

temporary storage means for temporarily storing the electronically processed image information input from the image read input means;

storage means, connected via the network, for storing attribute information of each of the plurality of terminals and the kind of document for each input image information unit discriminated by the document discrimination means;

reception means for receiving a transfer request, from the plurality of terminals, for transfer of the image information read by the image read input means;

conversion means for reading, when the reception means has received the transfer request for the transfer of the image information from the plurality of terminals, the attribute information of the terminal associated with the request and the kind of document for each input image information unit out of the storage means, and converting the image information stored in the temporary storage means on the basis of the read-out attribute information and kind of document for each input image information unit; and transfer means for transferring via the network the image information converted by the conversion means to the terminal of an origin of the transfer request.

BEST MODE OF CARRYING OUT THE INVENTION

An embodiment of the present invention will now be described with reference to the accompanying drawings.

Figure 1:
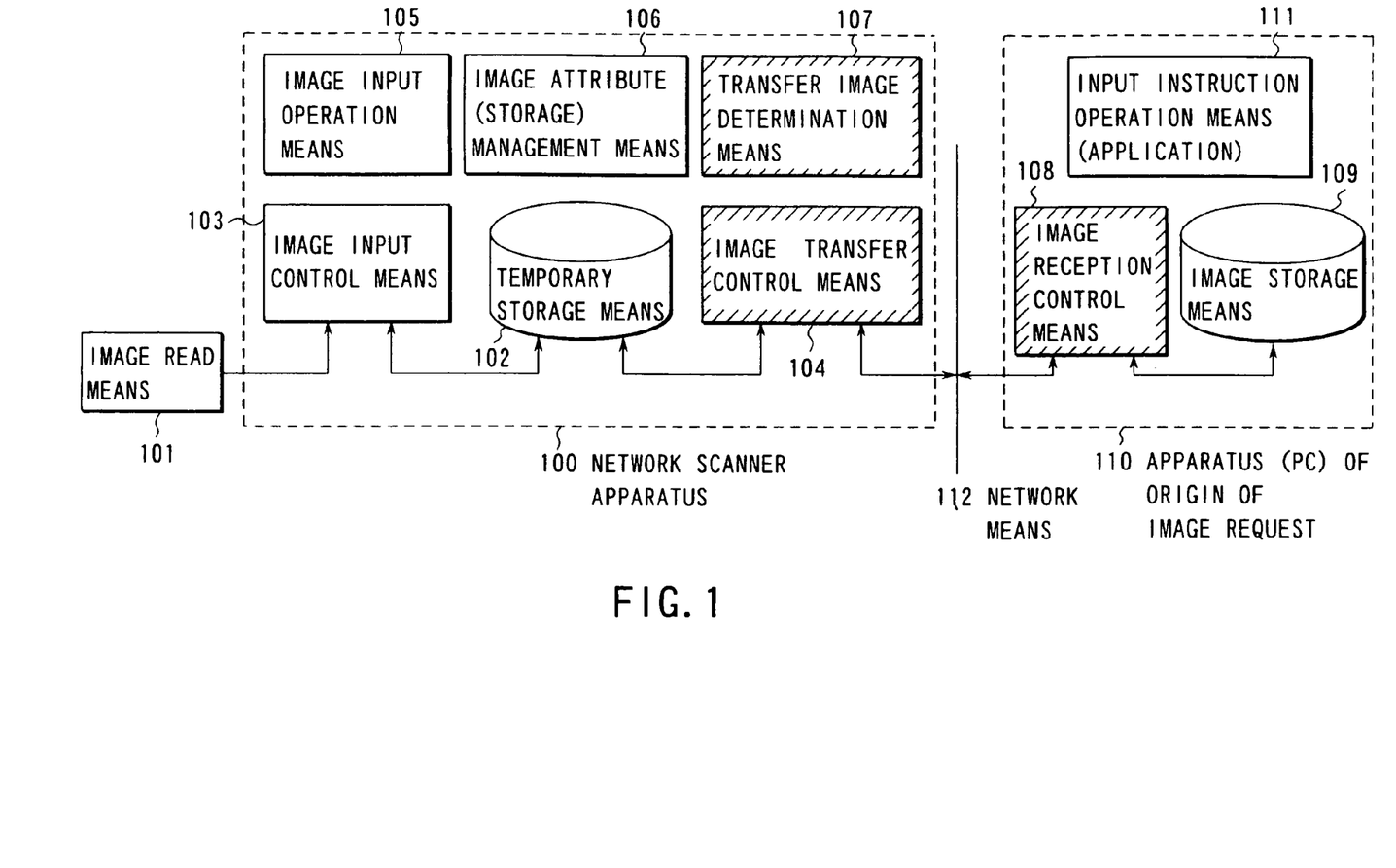
FIG. 1 is a block diagram showing a system structure of an office network to which a network scanner system according to the present invention is applied.

FIG. 1 is a block diagram showing a system structure of an office network to which a network scanner system according to the present invention is applied.

In FIG. 1, reference numeral 100 denotes a network scanner apparatus. The network scanner apparatus 100 comprises means denoted by reference numerals 101 to 106.

Specifically, reference numeral 101 denotes image read means serving as image read input means for reading an image, converting it to electronically processed image information, and inputting the converted information.

For example, a high-speed, high-performance scanner, etc. is used as the image read means 101.

Reference numeral 102 denotes temporary storage means for temporarily storing image information which has been read and electronically processed by the image read means 101.

Reference numeral 103 denotes image input control means for controlling the image read means 101 and temporary storage means 102. The image input control means 103 enables the image read means 101 to read an image, convert it to electronically processed image information, and input the converted information, and also transfers and stores the information in the temporary storage means 102.

Reference numeral 105 denotes image input operation means for controlling an operation panel which the user operates in front of the image read means 101 in the network scanner apparatus 100. In addition, the image input operation means 105 determines an instruction from the operation panel and controls the image input control means 103 provided at the lower level, thereby operating the image input.

Reference numeral 104 denotes image transfer control means for controlling the temporary storage means 102 and network communication means 112 and transferring the electronically processed input image information to the origin of request via the network.

Reference numeral 106 denotes image attribute (storage) management means for storing and managing, as attribute information of each terminal (described later), image attributes of the image information temporarily stored in the temporary storage means 102, for example, the name of the user inputting the image information, the image size, reading density (resolution), and the distinction between color image and monochromic image.

Reference numeral 107 denotes transfer image determination means for determining the next transfer image on the basis of the image attributes (attribute information of each terminal) in the image attribute management means 106 or according to an instruction from the origin of request.

On the other hand, reference numeral 110 denotes a terminal apparatus of an origin of image request, which comprises means denoted by reference numerals 108, 109 and 111.

Specifically, reference numeral 108 denotes image reception control means for controlling network communication means 112 and image storage means 109, receiving the image information transferred from the network, and storing the image information in the image storage means 109.

Reference numeral 111 denotes input instruction operation means which operates to request an image input to image input means such as the network scanner apparatus 100 in the network system.

The network scanner apparatus 100 is connected to the terminal apparatus 110 of the origin of image request via the network communication means 112. Thus, the transfer of images and transmission of various control information can be performed via the network communication means 112.

Figure 2:
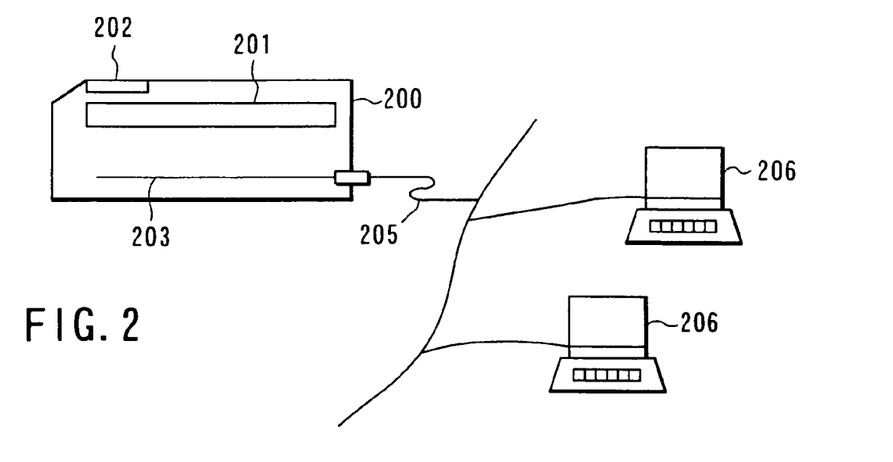
FIG. 2 is a view schematically showing the external appearance of the network scanner system according to the invention.

FIG. 2 schematically shows the external appearance of the network scanner system according to this invention.

This network scanner system is constructed such that image input means 200 serving as the network scanner apparatus 100 is shared by a plurality of input instruction operation means 206 serving as the terminal apparatus (PC) of the origin of image request.

Specifically, the image input means 200 and the plural input instruction operation means 206 are connected via a network 205.

In the image input means 200, reference numeral 201 denotes image read means which is controlled by a control board denoted by reference numeral 203.

The control board 203 is equipped with various control means shown in FIG. 1, thereby executing a series of controls.

In the image input means 200, reference numeral 202 denotes an operation panel operated by the user. All operations, such as setting of read modes, input of user ID and execution start of read, can be performed through the operation panel.

The operations and the contents of operations of this network scanner system will now be described.

Figure 3A:
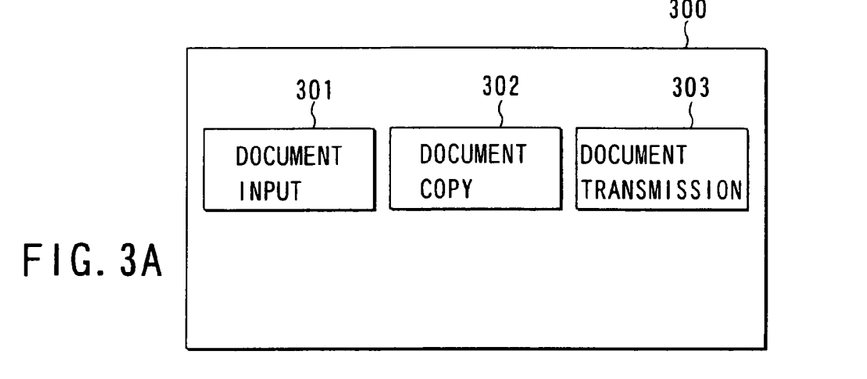
FIGS. 3A and 3B show screens of operation panels of a control board 203 controlled by image input operation means 105.
Figure 3B:
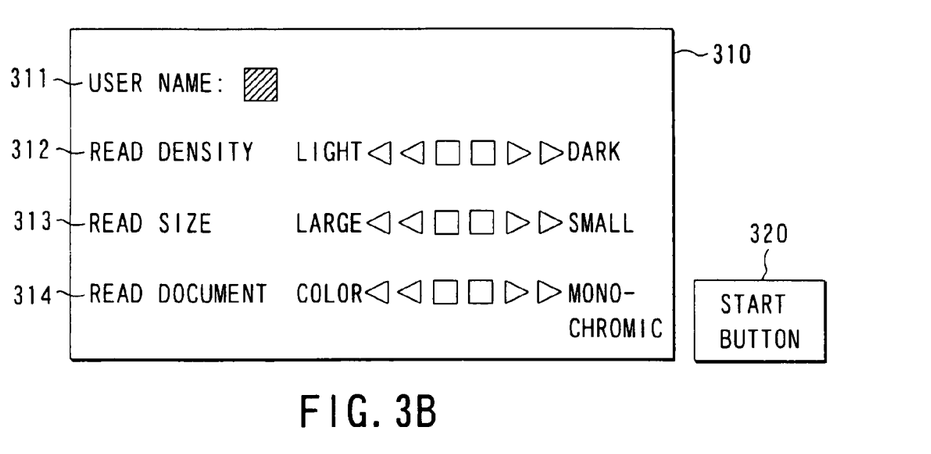

FIGS. 3A and 3B show screens of the operation panel of the control board 203 controlled by the image input operation means 105.

FIG. 3A show an initial screen 300 of the operation panel.

An image input 301 in the initial screen 300 through the image read means 101 such as a scanner will now be described.

As is shown in the initial screen 300, the network scanner apparatus 100 may be provided with a copying function through a document copy 302 with connection to a printer, and a facsimile (FAX) function through a document transmission 303 with connection to a public network.

For example, if the image input 301 in the initial screen 300, which comprises a touch panel, etc., is instructed, a screen 310 for instructing an image input mode is displayed as shown in FIG. 3B.

The user then instructs a user name 311, a read density 312, a read size 313 and an input mode of a color image or a monochromic image associated with a read document 314 in the screen 310 for instructing the image input mode. Thereafter, a start button 320 is depressed and the image input is executed.

Thus, the image input operation means 105 controls the image input control means 103, enables the image read means 101 to read the image in the designated read mode, and temporarily stores the read image in the temporary storage means 102 as electronically processed input image information.

If the input is thus normally completed, the image input operation means 105 registers, in the image attribute (storage) management means 106, the read mode and the name of the user who instructed the read mode as image attributes (attribute information of each terminal) along with the name of the image file stored in the temporary storage means 102.

Figure 4:
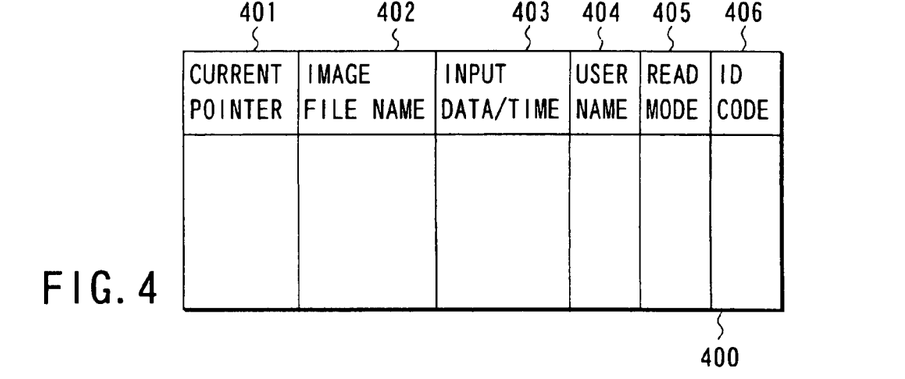
FIG. 4 shows an example of a management table 400 managed by image attribute management means 106.

FIG. 4 shows an example of a management table 400 of image attributes (attribute information of each terminal) stored and managed by the image attribute (storage) management means 106.

In this case, a read mode 405 is a read mode indicated by the read density 312, the read size 313 or the read document 314 of color image or monochromic image.

An image file name 402 is an image file name stored in the form of a file in the temporary storage means 102.

A current pointer 401 is an instruction pointer for instructing which image is to be transferred, when the user of the input image issues a request. This is the function characterizing the present invention. This image is determined by the transfer image determination means 107.

This management table 400 is further provided with an input date/time 403, a user name 40 and an ID code 406.

When the image thus stored in the temporary storage means 102 is to be used, the user issues various requests based on various applications. For example, the user requests that he/she wishes to use the image as image data on a general application on the PC, to register the image as a document file with a keyword, etc. added to the database, or to perform a character recognition function (OCR) for reuse of documents.

The apparatus 110 of the origin of image request is, for example, a PC. The image reception control means 108 and image storage means 109 are control means on the PC, and the input instruction operation means 111 indicates various applications.

Figure 5:
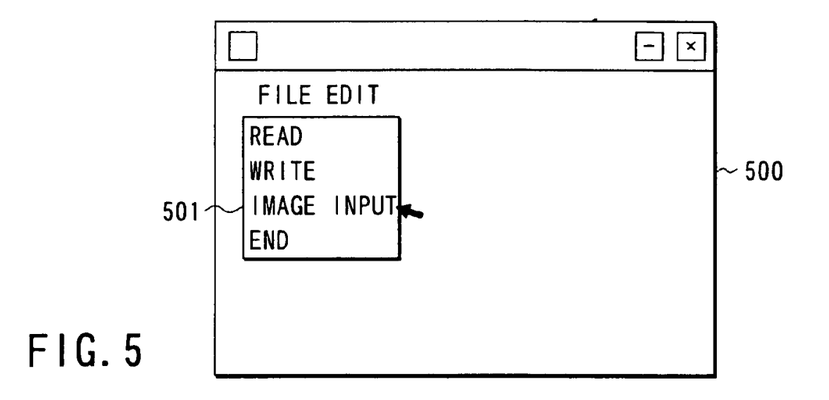
FIG. 5 shows an example of an input instruction screen 500 from the above-mentioned various applications through input instruction operation means 111.

FIG. 5 shows an example of an input instruction screen 500 from the various applications through the input instruction operation means 111.

In this case, the application indicates a file edit menu 501 in the input instruction screen 500. The image reception control means 108 is controlled by the operation of the image input indicated by the arrow. An image transfer request is issued to the image transfer control means 104 via the network 112.

Upon the request, the image transfer control means 104 takes out the image from the temporary storage means 102 on the basis of the determination result of the transfer image determination means 107, and transfers the image to the image reception control means 108.

In the following process, the image reception control means 108 receives the image and stores it in the image storage means 109 on the basis of the aforementioned application through the input instruction operation means 111.

The transfer image determination means 107 will now be described.

Figure 6:
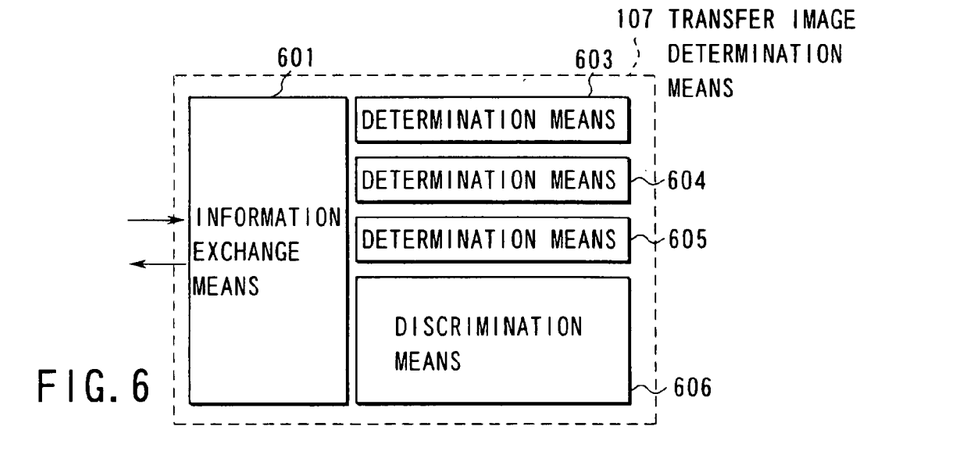
FIG. 6 is a block diagram showing details of transfer image determination means 107.

FIG. 6 is a detailed block diagram of the transfer image determination means 107.

Reference numeral 601 denotes information exchange means for exchange of information with the image transfer control means 104 and image attribute management means 106.

Reference numerals 603 to 605 denote determination means for performing determination, as described below.

When an image request is issued from the apparatus 110 of the origin of image request, the information exchange means 601 is kicked by the image transfer control means 104 and requests the image attributes (attribute information of each terminal) from the image attribute management means 106. Based on the instruction from the user, the image to be selected is determined with use of the determination means 603 to 605.

If the determination is "OK", the information exchange means 601 updates the current pointer 401 of image attribute management means 106 and returns "OK" to the image transfer control means 104.

The image transfer control means 104 takes out, from the image file name 402 in the management table 400, the image file name provided with the current pointer 401 as mentioned above, and reads out the associated image information from the temporary storage means 102 and transfers it.

The determination means 603 causes the apparatus 110 of the origin of image request to display the already stored image. Thereby, the user is made to instruct which image is to be selected, and the result is reflected on the current pointer 401.

Figure 7A:
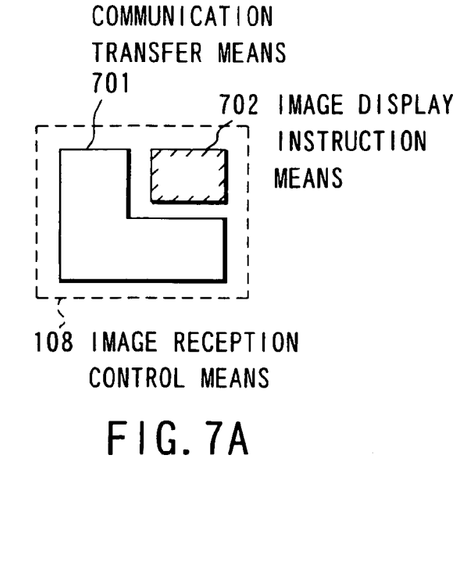
FIG. 7A shows an example of image reception control means 108 wherein communication transfer means 701 and image display instruction means 702 are provided.

This is achieved by providing the image reception control means 108 with communication transfer means 701 and image display instruction means 702, as shown in FIG. 7A.

Specifically, according to the instruction from the determination means 603, the image transfer control means 104 selects the image to be selected from the temporary storage means 102 and transfers it to the image display instruction means 702.

Figure 7B:
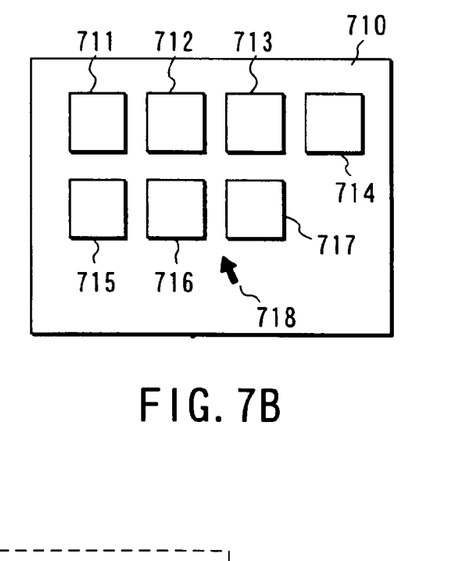
FIG. 7B shows an example wherein images 711 to 717 to be selected are displayed on a display screen 710 through the image display instruction means 702, thereby making the user perform instruction with an arrow 718 shown in the figure.

The image display instruction means 702 displays images 711 to 717 to be selected on a display screen 710, as shown in, for example, FIG. 7B. The user is thus made to give an instruction with an arrow 718 shown in the figure.

The communication transfer means 701 informs the determination means 603 with the result.

The determination means 603 sets for the selected image the current pointer 401 of the management table 400 managed by the image attribute management means 106 via the information exchange means 601.

The application by the input instruction operation means 111 executes an ordinary image input process, thereby acquiring the image provided with the current pointer 401.

This shows that the application by the input instruction operation means 111 can be used very conveniently with no alteration in the network scanner shared in this manner.

Figure 8:
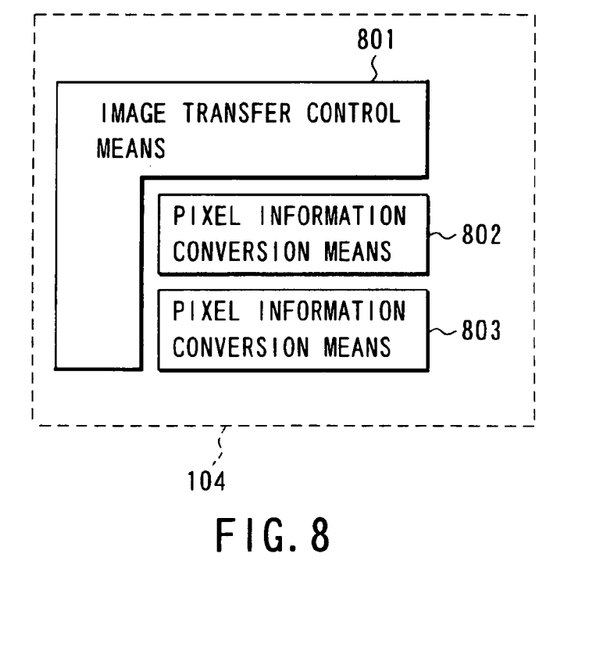
FIG. 8 shows an internal structure of image transfer control means 104.

FIG. 8 shows an internal structure of the image transfer control means 104.

Reference numeral 801 indicates the above-mentioned image transfer control means. This means is characterized by comprising image process function means denoted by reference numerals 802 and 803.

Reference numeral 802 denotes pixel information conversion means, and reference numeral 803 pixel density conversion means.

It is preferable from a standpoint of operation that the images 711 to 717 displayed by the image display instruction means 702 be reduced images so that the contents of the images can be understood at a glance.

For this purpose, it is necessary to send the original images to the image display instruction means 702 after the size of the original images have been converted.

This process is carried out by the pixel density conversion means 803 provided in the image transfer control means 104 (image transfer control means 801).

The image transfer control means 104 (image transfer control means 801) has a function of selecting the pixel information conversion means 802 and pixel density conversion means 803 on the basis of the content of request from the apparatus 110 of the original of image request, and transferring the image while carrying out the conversion.

The determination means 604 has a function of automatically selecting the image stored in the temporary storage means 102, on the basis of the image input time from the input date/time 403 on the management table 400 of the image attribute management means 106.

There are three standards for the selection by the determination means 604.

According to one standard, a latest image is automatically selected. According to another, an earliest image is automatically selected. According to the other, an image input in a preset time period is automatically selected.

One of the three standards is instructed by a separately provided standard selection means (not shown). Based on the instruction result, the determination means 604 executes the determination of automatic selection of the image.

For example, in the case where the selection standard is based on the latest image, when the image input is executed by the network scanner apparatus 100 and the image is to be taken out of the apparatus 110 of the origin of image request, the determination means 604 selects already input images successively from the latest one.

In the case where the selection standard is based on the earliest image, the determination means 604 selects already input images successively from the earliest one in the reverse manner.

In the case where the selection standard is based on the preset time period, the images in the preset time period are successively selected from the latest one or earliest one.

The determination means 605 has a function of discriminating and selecting a pre-designated image.

In FIG. 6, reference numeral 606 denotes discrimination means for discriminating whether the image information is a cover sheet or a document indication, or whether a pre-designated mark is added.

In general, the function of the discrimination means 606 may be executed by some other server on the network 112, in order to perform high-precision discrimination realized by an OCR, a mark reader (OMR), a bar-code reader (BCR), or a combination thereof.

For example, if an image is input, the determination means 604 immediately causes the discrimination means 606 to execute a discrimination operation. The discrimination means 606 determines whether the image corresponds to any one of the above or not. The result is registered on the ID code 406 in the management table 400.

If the determination method is designated in the determination means 604 by the instruction from the apparatus 110 of the origin of image request, the image is provided with the current pointer 401.

Based on a user identifier input at the time of input, the determination means 605 determines coincidence/non-coincidence with the user of the request and provides the current pointer 401.

The designation by the current pointer 401 may be flexible, such as "image of designated user" and "image of non-designated user", or "user A and user B".

The work efficiency can be greatly improved in the mode of inputting in advance the image information through the network scanner apparatus 100 and then using it in the apparatus 110 of the origin of image request, as in the present invention.

There is a case, however, where the input mode at the time of inputting through the network scanner apparatus 100 does not consist with the output mode at the time of using the input information.

For example, there is a case where an input color image may be used in a monochromic mode, or an image input at a pixel density of 600 dpi may be used at 100 dpi with no problem.

The other feature of the present invention resides in that a difference between the input image and the requested image can be automatically canceled.

As has been described above, the image transfer control means 104 has the functions as shown in FIG. 8.

The pixel information conversion means 802 has the following functions:

(1) a function of extracting a luminance component of a color image consisting of a plurality of bits and converting it to a monochromic image;

(2) a function of providing a predetermined color in accordance with a density of a monochromic image;

(3) a function of converting a gray-scale pixel to a dither or an error diffusion image; and (4) a function of converting a gray-scale color image to a dither or an error diffusion color pixel.

On the other hand, the pixel density conversion means 803 converts the pixel density from 600 dpi to 300 dpi or from 300 dpi to 400 dpi in accordance with the instruction from the apparatus 110 of the origin of image request.

At first, the image transfer control means 801 compares the request specifications relating to the image attributes (attribute information of each terminal) from the apparatus 110 of the origin of image request, and the attributes of the image stored in the temporary storing means 102.

On the basis of the comparison, if conversion is required, the image transfer control means 801 transfers to the apparatus 110 of the origin of image request the image which was subjected to the aforementioned predetermined conversion process with use of the pixel information conversion means 802, the pixel density conversion means 803, or both.

According to the above-described embodiment of the present invention, there is provided a network scanner system with much higher operability than in the prior art, wherein an environment with high operability, like that of individually connected local scanners, can be provided for an image input apparatus shared and connected via a network, and previously input images can be variously converted and images to be used in any applications can be input by a single operation.

Therefore, the present invention, as described above, can provide a network scanner system wherein an operational environment for a shared scanner connected to a network, which is the same as or better than an operational environment for a locally connected scanner, can be realized, and image information can be input with use of a scanner to constitute a database or reuse the information as documents in working at offices, thereby meeting a need for using a great deal of images/documents.

The invention claimed is:

1. A network scanning method comprising:
inputting an image to obtain an input image to be used in a plurality of applications that is input by a scanner, the input image being capable of being converted in a plurality of different manners;
temporarily storing the input image;
controlling attribute information concerning the input image temporarily stored, the attribute information being related to a current pointer for specifying the input image;
permitting a user to select, at an origin of image request, a desired one of the temporarily stored images in accordance with one of the applications;
determining which image is to be transferred based on the current pointer of the image selected, to the origin of the image request, by utilizing the attribute information, and updating the current pointer corresponding to the image to be transferred;
taking out image information corresponding to the current pointer, among the attribute information;
reading out the image corresponding to the image information taken out, at the time of request from the origin of the image request based on the current pointer updated, among the temporarily stored images, and converting or non-converting the image to a predetermined image in accordance with the one of the applications, and
transferring the predetermined image converted or non-converted by the conversion step for use in the one of the applications to the origin of the image request via a network.

2. A network scanning method according to claim 1, wherein the converting step includes converting, when the desired image is selected, the input image temporarily stored to a reduced image, in order to display the input image temporarily stored at the origin of the image request.

3. A network scanning method according to claim 1, wherein the attribute information includes time information in which an image is input by the inputting step, and wherein the permitting step automatically selects an image from the temporarily stored images on the basis of the time information and in accordance with a preset standard.

4. A network scanning method according to claim 1, wherein the attribute information includes a user name, a size of an image, a read density and color/monochromic distinction.

5. A network scanning method according to claim 1, further comprising: discriminating a type of document from the input image input by the inputting step for each unit of the input image,
wherein the attribute information is controlled and information concerning the type of document is discriminated,
wherein the permitting step permits a user at the origin of the image request to select a desired one of temporarily stored images on the basis of a current pointer and information concerning the type of document; and
wherein the reading out step determines which one of a cover sheet, a cover and a document with a specific mark corresponds to the type of document of the desired image in accordance with a preset standard, and on the basis of the information concerning the type of document controlled, thereby reading out the desired image that is being temporarily stored at the time of the request fro the origin of the image request to transfer the desired image to the origin of the image request via the network.

6. A network scanning method according to claim 1, wherein the current pointer is an instruction pointer for instructing which image is to be transferred, when the user makes a selection via the permitting step.

7. A network scanning method according to claim 1, wherein the user at the origin of image request selects the desired one of the temporarily stored images along with a request for a particular image format, and wherein the converting step converts the image to the predetermined image in accordance with the particular image format.

8. A network scanning method according to claim 7, wherein the particular image format differs in pixel density from an image format of the image selected.

9. A network scanning method according to claim 1, wherein the permitting step outputs image information for each of the temporarily stored images, to be displayed on separate locations on a single display screen at the origin of image request.

10. A network scanning method comprising:
inputting an image to obtain an input image to be used in a plurality of applications that is input by a scanner, the input image being capable of being converted in a plurality of different manners;
instructing an input mode at the time of scanning the image;
temporarily storing the input image;
controlling attribute information concerning the input image temporarily stored and information concerning the input mode instructed, the attribute information being related to a current pointer for specifying the input image;
permitting a user at an origin of image request to select a desired one of the temporarily stored images and output mode instruction information controlled in accordance with one of the applications;
determining which image is to be transferred, based on the current pointer of the image selected, to the origin of the image request, by utilizing the attribute information, and updating the current pointer corresponding to the image to be transferred;
taking out image information corresponding to the current pointer updated;
reading out the image corresponding to the image information taken out at the time of request from the origin of the image request based on the current pointer updated among the temporarily stored images, and determining the image in accordance with the input mode instruction information controlled and output mode instruction information from the origin of the image request, and converting, when the input mode instruction information and output mode instruction information are different from each other in instruction content, the image in accordance with the output mode instruction information; and
transferring the desired image that has been read out at the time of the request from the origin of the image request based on the current pointer included in the attribute information and converted, in accordance with the output mode instruction information via a network to the origin of the image request.

11. A network scanning method according to claim 10, wherein the current pointer is an instruction pointer for instructing which image is to be transferred, when the user makes a selection via the permitting step.

12. A network scanning method according to claim 10, wherein the image conversion step execute either conversion of a size or pixel density of the desired image in accordance with a preset standard and on the basis of the output mode instruction information when the input mode instruction information and output mode instruction information are different from each other in instruction content.

13. A network scanning method according to claim 10, wherein the image conversion step execute either conversion from a color image to a monochrome image or correction of density information of the desired image in accordance with a preset standard and on the basis of the output mode instruction information when the input mode instruction information and output mode instruction information are different from each other in instruction content.

* * * * *